US012618520B2

(12) United States Patent
Deletre et al.

(10) Patent No.: US 12,618,520 B2
(45) Date of Patent: May 5, 2026

(54) SEALED AND THERMALLY INSULATING TANK

(71) Applicant: Gaztransport et Technigaz, Saint Remy les Chevreuse (FR)

(72) Inventors: Bruno Deletre, Saint Remy les Chevreuse (FR); Alain Tessier, Saint Remy les Chevreuse (FR); Vincent Lorin, Saint Remy les Chevreuse (FR); Marc Boyeau, Saint Remy les Chevreuse (FR); Vincent Berger, Saint Remy les Chevreuse (FR)

(73) Assignee: Gaztransport et Technigaz, Saint Remy les Chevreuse (FR)

( * ) Notice: Subject to any disclaimer, the term of this patent is extended or adjusted under 35 U.S.C. 154(b) by 401 days.

(21) Appl. No.: 18/016,628

(22) PCT Filed: Jul. 7, 2021

(86) PCT No.: PCT/EP2021/068798

§ 371 (c)(1),
(2) Date: Jan. 17, 2023

(87) PCT Pub. No.: WO2022/013031

PCT Pub. Date: Jan. 20, 2022

(65) Prior Publication Data

US 2023/0288028 A1 Sep. 14, 2023

(30) Foreign Application Priority Data

Jul. 17, 2020 (FR) ...................................... 2007560
Oct. 29, 2020 (FR) ...................................... 2011105
Dec. 3, 2020 (FR) ...................................... 2012578

(51) Int. Cl.
*F17C 3/02* (2006.01)
*F17C 6/00* (2006.01)
*F17C 7/02* (2006.01)

(52) U.S. Cl.
CPC ................ *F17C 3/027* (2013.01); *F17C 6/00* (2013.01); *F17C 7/02* (2013.01);
(Continued)

(58) Field of Classification Search
CPC .... F17C 3/027; F17C 6/00; F17C 7/02; F17C 2201/0157; F17C 2201/052;
(Continued)

(56) References Cited

U.S. PATENT DOCUMENTS

2016/0252210 A1 9/2016 Bougault et al.
2021/0317950 A1* 10/2021 Sassi ........................ F17C 3/04

FOREIGN PATENT DOCUMENTS

FR 3084645 A1 2/2020
KR 20160021351 A 2/2016
(Continued)

OTHER PUBLICATIONS

English Machine Translation of WO-2019012236-A1 (Year: 2019).*

*Primary Examiner* — Laura E. Parker
(74) *Attorney, Agent, or Firm* — Calderon Safran & Wright PC; Corinne Marie Pouliquen

(57) ABSTRACT

The invention relates to a sealed and thermally insulating tank for storing fluid, comprising, from the outside to the inside of the tank, a secondary thermally insulating barrier and a secondary sealing membrane, the secondary sealing membrane being secured to the secondary thermally insulating barrier, a primary thermally insulating barrier resting against the secondary sealing membrane and a primary sealing membrane resting against the primary thermally insulating barrier, the tank comprising a duct that extends
(Continued)

along a longitudinal direction, the duct being delimited on one hand by the secondary thermally insulating barrier and on the other hand by the secondary sealing membrane, a bottom of the duct being at least in part formed by the secondary thermally insulating barrier, the tank further comprising a pressure-drop stopper that is arranged in the duct and extends between the bottom of the duct and the sealing membrane.

12 Claims, 7 Drawing Sheets

(52) U.S. Cl.
CPC ................. *F17C 2201/0157* (2013.01); *F17C 2201/052* (2013.01); *F17C 2203/0358* (2013.01); *F17C 2203/0629* (2013.01); *F17C 2203/0651* (2013.01); *F17C 2203/066* (2013.01); *F17C 2205/0355* (2013.01); *F17C 2221/033* (2013.01); *F17C 2223/0161* (2013.01); *F17C 2260/033* (2013.01); *F17C 2270/0107* (2013.01)

(58) Field of Classification Search
CPC ...... F17C 2203/0358; F17C 2203/0629; F17C 2203/0651; F17C 2203/066; F17C 2205/0355; F17C 2221/033; F17C 2223/0161; F17C 2260/033; F17C 2270/0107; F17C 2223/033
USPC .............................................. 220/560.12, 568
See application file for complete search history.

(56) References Cited

FOREIGN PATENT DOCUMENTS

| | | | | | |
|---|---|---|---|---|---|
| WO | WO2014167214 | A2 | | 10/2014 | |
| WO | WO-2019012236 | A1 | * | 1/2019 | ............. F17C 3/027 |

* cited by examiner

Fig. 3
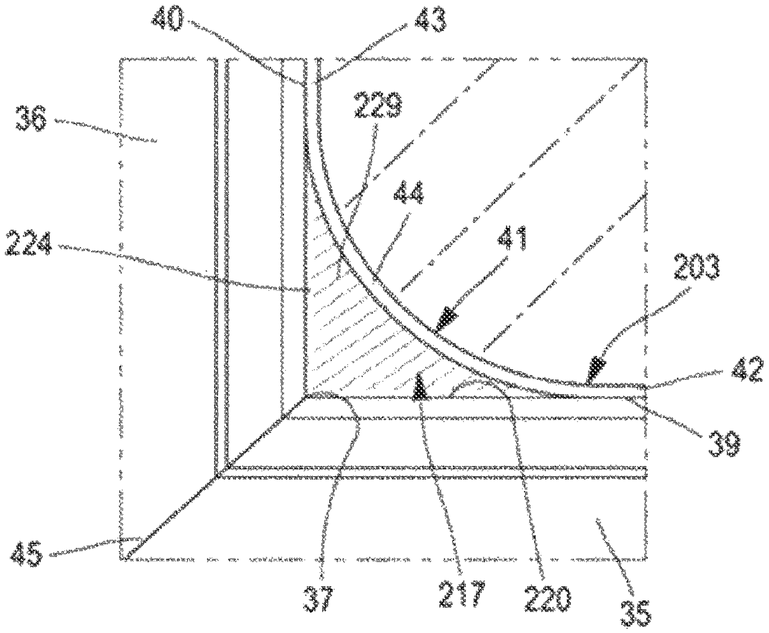
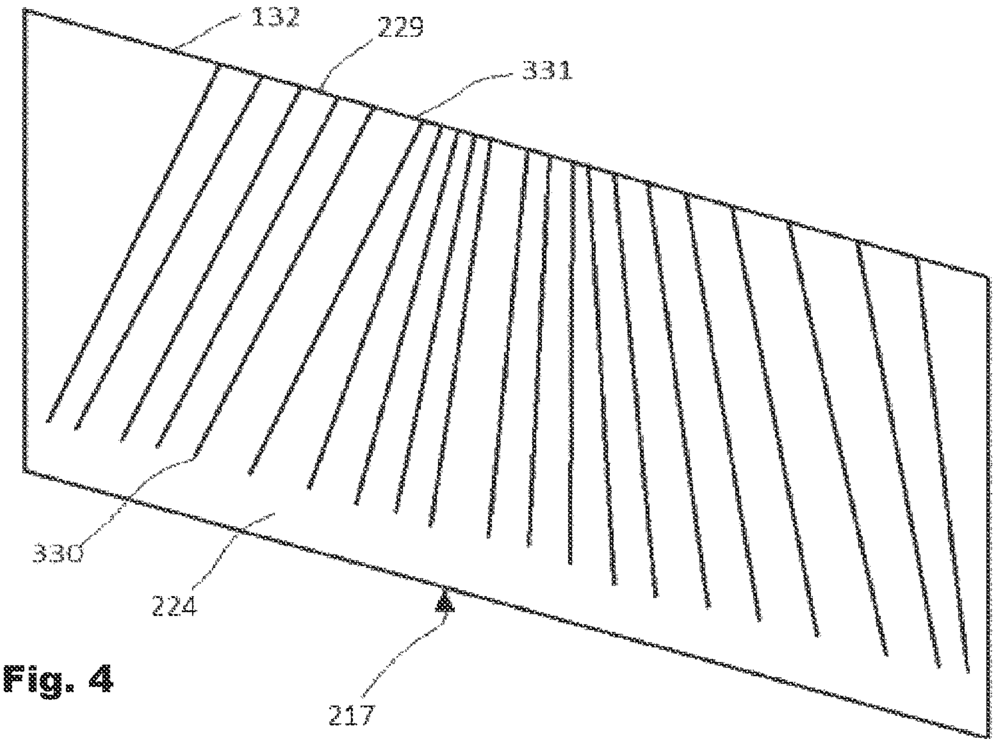
Fig. 4

Fig. 5
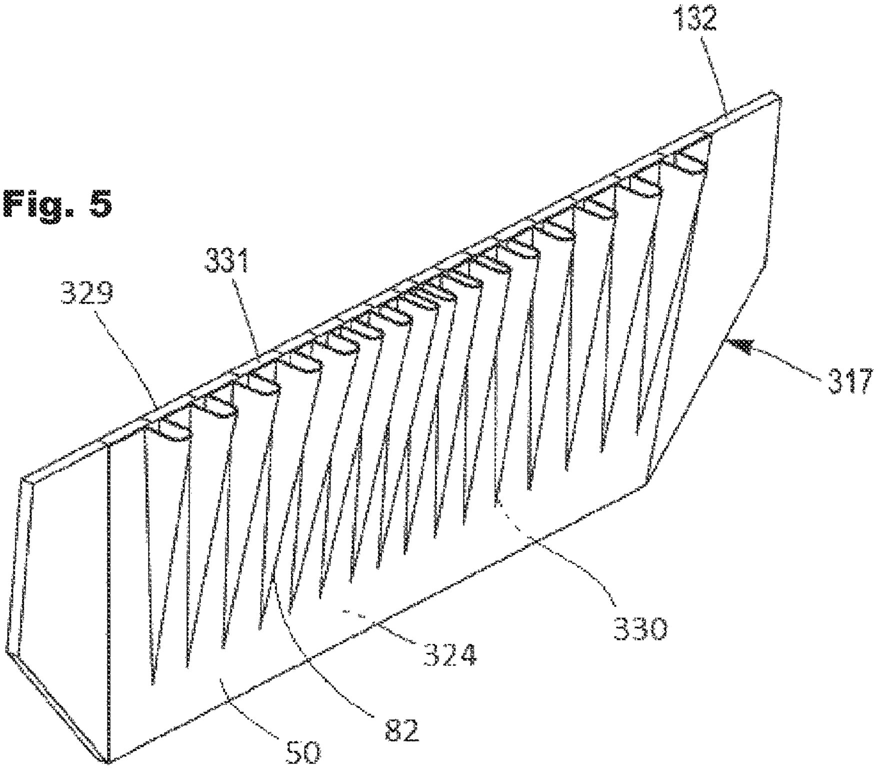
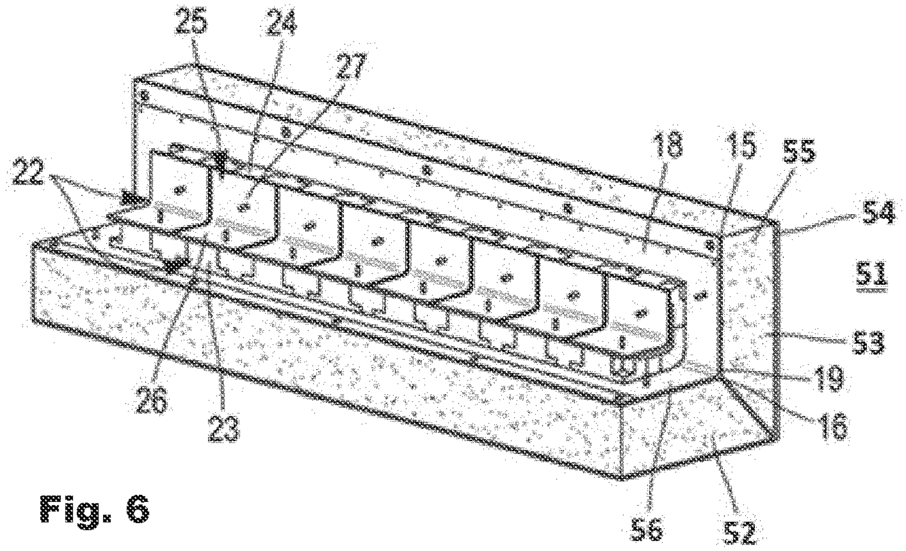
Fig. 6

SEALED AND THERMALLY INSULATING TANK

CROSS-REFERENCE TO RELATED APPLICATIONS AND CLAIM TO PRIORITY

This application is a national stage application of International Application No. PCT/EP2021/068798 filed Jul. 7, 2021, which claims priority to French Patent Application No. 2007560 filed Jul. 17, 2020, the disclosures of which are incorporated herein by reference and to which priority is claimed.

FIELD OF THE INVENTION

The invention relates to the field of sealed and thermally-insulating membrane tanks for storing and/or transporting fluids, such as a cryogenic fluid.

Sealed and thermally-insulating membrane tanks are employed in particular to store liquefied natural gas (LNG) which is stored at atmospheric pressure at approximately 162° C. These tanks may be installed on land or on a floating structure. In the case of a floating structure the tank may be intended to transport liquefied natural gas or to receive liquefied natural gas serving as fuel for the propulsion of the floating structure.

BACKGROUND OF THE INVENTION

In the prior art there are known sealed and thermally-insulating tanks for storing liquefied natural gas integrated into a supporting structure such as the double hull of a ship intended to transport liquefied natural gas. Tanks of this kind generally have a multilayer structure including in succession, in the direction of thickness, from the exterior to the interior of the tank, a secondary thermally-insulating barrier retained on the supporting structure, a secondary sealed membrane resting against the secondary thermally-insulating barrier, a primary thermally-insulating barrier resting against the secondary sealed membrane, and a primary sealed membrane resting against the primary thermally-insulating barrier and intended to be in contact with the liquefied natural gas contained in the tank.

The document WO2014167214 A2 describes a multilayer sealed and thermally-insulating tank corner structure in which the secondary thermally-insulating barrier includes at the level of a corner between two walls of the tank two insulating panels forming an edge, the secondary sealed membrane including in line with said edge a flexible sealed film connecting secondary sealed membrane portions of said two tank walls.

A central portion of this flexible sealed film, that is to say that between the portions of said flexible sealed film anchored to the secondary sealed membrane portions of the two tank walls, is not anchored to the secondary thermally-insulating barrier and is therefore free relative to said secondary thermally-insulating barrier.

Accordingly, when the sealed and thermally-insulating tank is cooled, the thermal contraction of the insulating panels forming the edge and of the sealed membrane is absorbed by deformation of the central portion of the flexible sealed film, and said flexible sealed film is typically able to stretch to absorb loads linked to this contraction. However, if the flexible film is stretched a gap appears or increases in size between said central portion of the flexible sealed film and the thermally-insulating barrier. This gap extends all along the length of the edge.

A gap of this kind forms a duct favouring convection and is therefore liable to degrade the thermal insulation performance of the tank, in particular in the context of edges having a component parallel to the direction of terrestrial gravity.

SUMMARY OF THE INVENTION

One idea on which the invention is based is to propose a sealed and thermally-insulating tank in which the phenomena of convection are reduced. In particular, one idea on which the invention is based is to provide a sealed and thermally-insulating tank limiting the presence of continuous circulation ducts in the thermally-insulating barriers and more particularly between the thermally-insulating barriers and the sealed membranes, in order to limit the phenomena of natural convection in said thermally-insulating barriers.

In accordance with one embodiment, the invention provides a sealed and thermally-insulating fluid storage tank in which a tank wall includes from the exterior to the interior of the tank a secondary thermally-insulating barrier and a secondary sealed membrane, the secondary sealed membrane being anchored to the secondary thermally-insulating barrier, a primary thermally-insulating barrier resting against the secondary sealed membrane and a primary sealed membrane resting against the primary thermally-insulating barrier and being intended to be in contact with a fluid contained in the tank, in which said secondary thermally-insulating barrier includes a first plane portion and a second plane portion oriented at an angle to the first plane portion, a junction between the first secondary thermally-insulating barrier plane portion and the second secondary thermally-insulating barrier plane portion forming an edge, the first plane portion forming a first anchor zone for the secondary sealed membrane, the first anchor zone being at a distance from the edge, the second plane portion forming a second anchor zone for the secondary sealed membrane, the second anchor zone being at a distance from the edge, the secondary thermally-insulating barrier including a corner portion between the first anchor zone and the second anchor zone and including the edge, the secondary sealed membrane including a corner piece, said corner piece being sealed and including a first portion anchored to the first anchor zone and a second portion anchored to the second anchor zone, the corner piece further including a central portion between the first portion and the second portion, said central portion being free to deform relative to the secondary thermally-insulating barrier in line with the edge, the tank including a duct extending in a longitudinal direction parallel to the edge, said duct being delimited by the central portion of the secondary sealed membrane and the corner portion of the secondary thermally-insulating barrier, the corner portion of the secondary thermally-insulating barrier forming a bottom of the duct, the tank further including a pressure-drop obstacle arranged in the duct and extending between the bottom of the duct and the central portion of the secondary sealed membrane.

Thanks to these features, the phenomena of convection in the tank, and in particular in the duct, are reduced. In fact, the pressure-drop obstacle makes it possible to generate a pressure drop in a flow that can arise in the duct whilst allowing the circulation of gas, for example of inert gas.

The term “pressure-drop obstacle” is defined in accordance with the invention as an obstacle enabling dissipation by friction of the mechanical energy of a fluid in movement.

That is to say an obstacle causing a pressure drop of the fluid due to the resistance that the fluid encounters on flowing over or through the obstacle.

Embodiments of a sealed and thermally-insulating tank of this kind may have one or more of the following features.

In accordance with one embodiment, the duct is parallel to the direction of terrestrial gravity. In other words, the duct is parallel to a vertical direction of the tank.

Vertical ducts of this kind are those most likely to favour the phenomena of convection so that the arrangement of the pressure-drop obstacle or obstacles in a duct of this kind is particularly advantageous and effectively reduces the phenomena of convection.

In accordance with one embodiment, the duct has a component parallel to the direction of terrestrial gravity. Thus the duct may be vertical or oblique relative to the vertical direction of the tank.

In accordance with another embodiment, the duct is perpendicular to the direction of terrestrial gravity.

In accordance with one embodiment, the duct has a component perpendicular to the direction of terrestrial gravity.

In accordance with one embodiment, the duct extends along the sealed membrane.

In accordance with one embodiment, the pressure-drop obstacle includes at least one fixing zone.

In accordance with one embodiment the pressure-drop obstacle includes at least one flexible element enabling the pressure drop.

In accordance with one embodiment, said pressure-drop obstacle includes an anchor strip and a flexible portion, the anchor strip extending in a direction intersecting the longitudinal direction of the duct, the flexible portion including a plurality of flexible elements projecting from the anchor strip in the direction of the secondary sealed membrane, and a free end of the flexible elements opposite the anchor strip being in contact with the secondary sealed membrane so as to create a pressure drop for a flow circulating in the duct, said flexible elements being able to flex elastically in contact with the secondary sealed membrane.

In accordance with one embodiment, the pressure-drop obstacle includes a first portion and a second portion, the anchor strip of the pressure-drop obstacle including a first anchor strip portion formed by the first portion of the pressure-drop obstacle and a second anchor strip portion formed by the second portion of the pressure-drop obstacle, the flexible portion of the pressure-drop obstacle including a flexible first portion formed by the first portion of the pressure-drop obstacle and a flexible second portion formed by the second portion of the pressure-drop obstacle.

The pressure-drop obstacle extending between the bottom of the duct and the sealed membrane, on the one hand, and, on the other hand, the anchor strip extending in a direction intersecting the longitudinal direction of the duct and the flexible portion extending as far as the sealed membrane enable good obstruction of the duct. Moreover, the elasticity of the flexible portion and the sealed membrane bearing on said flexible portion provide a simple way to obstruct the duct in a manner permeable to the gas whilst generating a pressure drop for a flow of gas circulating in the duct. Moreover, this elasticity of the flexible portion provides a simple way to ignore tolerances of manufacture and/or of positioning of the thermally-insulating barrier and/or of the sealed membrane whilst preserving good obstruction of the duct. In fact, the flexible elements being deformable independently of one another, the deformations of the various flexible elements make it possible to absorb the variations of the section of ducts linked to tolerances of manufacture or of positioning whilst obstructing the duct in a satisfactory manner.

Moreover, the plurality and the length of the flexible elements forming the flexible portion enable simple deformation of the flexible portion. These flexible elements also make possible a pressure drop that can be modulated as a function of the number of flexible elements; the greater that number the greater the number of passages for the circulation of the gas, the gas being able to circulate between two adjacent flexible elements, in particular when one of said adjacent flexible elements is more deformed than the other by the sealed membrane bearing on it.

In accordance with one embodiment, the flexible elements are elastic flexible blades.

In accordance with one embodiment, the flexible elements are juxtaposed in such a manner that, in the absence of loads on said flexible elements, said flexible elements extend in the same plane.

In accordance with one embodiment, the flexible elements extend in a plane intersecting, and preferably perpendicular to, the longitudinal direction of the groove. Some of these blades may in particular extend in a plane perpendicular to the longitudinal direction of the duct.

In accordance with one embodiment, the flexible elements are able to flex elastically in the longitudinal direction of the duct.

Flexible elements of this kind, arranged in the same plane, enable good obstruction of the duct.

Blades of this kind may extend in different directions.

In accordance with one embodiment, the blades extend in a direction perpendicular to the direction of thickness of the thermally-insulating barrier.

In accordance with one embodiment, the blades extend in a direction parallel to the direction of thickness of the thermally-insulating barrier.

In accordance with one embodiment, at least two of said blades extend in respective different directions.

In accordance with one embodiment the blades extend in a direction perpendicular to a portion of the anchor strip from which said blades respectively project.

In accordance with one embodiment, the blades extend in a plane intersecting the longitudinal direction of the duct. Some of these blades may in particular extend in a plane perpendicular to the longitudinal direction of the duct.

In accordance with one embodiment, the flexible are elastic rods, for example of similar shape to the bristles of a brush.

Thanks to these features, the flexible portion of the pressure-drop obstacle is easily deformable by a load exerted by the sealed membrane. Moreover, flexible elements of this kind ensure good obstruction of the duct.

In accordance with one embodiment, the flexible elements are juxtaposed in such a manner that, in the absence of any load on said flexible elements, the free ends of said flexible elements extend in the same plane.

In accordance with one embodiment, in the absence of loads on said flexible elements, the flexible elements extend over a distance in the direction of thickness of the thermally-insulating barrier greater than or equal to the depth of the duct in said thickness direction of the thermally-insulating barrier.

Thanks to the length of the flexible elements and to the elasticity of said flexible elements, the pressure-drop obstacle enables obstruction of the duct during use of the tank. In particular, flexible elements of this kind remain in contact with the membrane even in the event of cooling of the tank causing contraction of the sealed membrane.

In accordance with one embodiment, pairs of adjacent flexible elements are in contact in the absence of loads on the flexible portion, typically in the absence of deformation linked to the sealed membrane bearing on them.

In accordance with one embodiment, the flexible portion extends, in projection in a plane perpendicular to the longitudinal direction of the duct, over all the section of the duct in said plane perpendicular to the longitudinal direction of the duct.

Thanks to these features, the flexible portion ensures good obstruction of the duct whilst allowing flow with a pressure drop. In fact, the contact between the flexible elements does not enable obstruction of the flow.

In accordance with one embodiment, the anchor strip is fixed to the bottom of the duct.

Fixing the anchor strip to the bottom of the duct guarantees that the pressure-drop obstacle extends from the bottom of the duct, thus ensuring effective obstruction of the pressure-drop obstacle.

In accordance with one embodiment, the anchor strip rests on the bottom of the duct.

In accordance with one embodiment, the pressure-drop obstacle includes a textile layer covering flexible elements of the pressure-drop obstacle or even all of the flexible portion and the anchor strip of the pressure-drop obstacle.

In accordance with one embodiment, the textile layer of the obstacle covers some of the flexible elements.

In accordance with one embodiment, the textile layer of the pressure-drop obstacle covers between 20% and 70% of a face of the flexible elements, for example 50% or 60% of a face of the flexible elements. This feature enables monitoring of the circulation of gas in the duct.

In accordance with one embodiment, the textile layer covers a face of the pressure-drop obstacle first receiving the flow, that is to say facing upstream relative to the flow. This arrangement is particularly advantageous and enables effective retention of the textile layer on the flexible portion and the anchor strip whilst limiting the risk of detachment of the textile layer. In fact, the flow of the fluid exerts a force in the direction of the various elements of the pressure-drop obstacle, and the textile layer is therefore then pressed firmly against the flexible portion and the anchor strip of the pressure-drop obstacle. In accordance with another embodiment, the textile layer covers the other face of the pressure-drop obstacle, facing downstream relative to the flow.

In accordance with one embodiment, the pressure-drop obstacle may comprise a plurality of materials. For example, a first woven fabric covers a first surface of the pressure-drop obstacle and a second woven fabric covers a second surface of the pressure-drop obstacle. Another example is superposition of at least two woven fabrics covering the same surface of the pressure-drop obstacle.

In accordance with one embodiment, the pressure-drop obstacle includes a textile layer permeable to the gas, for example of woven fabric or non-woven material, covering flexible elements of the pressure-drop obstacle. The textile layer may be fixed to one face of the anchor strip and/or to one face of the flexible portion of the pressure-drop obstacle, for example by gluing it thereto. Polyurethane or epoxy glue may in particular be used. The textile layer may be made of mineral fibers, for example glass fibers, or man-made fibers.

In accordance with one embodiment, the sealed membrane exerts a greater load on the flexible portion of the pressure-drop obstacle, generating greater deformation of said flexible portion, when the tank is at ambient temperature than when the tank is cooled, that is to say when the storage space of the tank includes a cold liquid such as a cryogenic liquid, for example liquefied natural gas.

Thanks to these features, it is possible to increase the pressure drop in the flows circulating in the duct.

In accordance with one embodiment, the textile layer is flexible.

The textile layer therefore does not impede the elastic deformation of the flexible portion.

In accordance with one embodiment, the pressure-drop obstacle includes a flexible film, said flexible film including a first fixing zone and a second fixing zone, the first fixing zone extending transversely to the longitudinal direction of the duct, the first fixing zone of said flexible film being fixed to the bottom of the duct, the second fixing zone extending transversely to the longitudinal direction of the duct, the second fixing zone being fixed to the external face of the second sealed membrane delimiting the duct, the flexible film including an obstacle portion extending from the first fixing zone to the second fixing zone, said obstacle portion extending across the duct between the bottom of the duct and the secondary sealed membrane so as to create a pressure drop in the duct.

By fixing zone extending transversely to the longitudinal direction of the duct is meant a zone of the flexible film extending in such a way as to intersect the longitudinal direction of the duct, preferably perpendicularly.

Thanks to these features, the phenomena of convection in the tank, and in particular in the duct, are reduced. In fact, the pressure-drop obstacle enables generation of a pressure drop in a flow that can arrive in the duct whilst allowing the circulation of gas, for example of inert gas.

In fact, the first fixing zone of the flexible film being fixed to the bottom of the duct in a direction transverse to the longitudinal direction of the duct and the second fixing zone being fixed to the external face of the sealed membrane in a direction transverse to the longitudinal direction of the duct, the obstacle portion extends between the bottom of the duct and the external face of the sealed membrane, thus allowing good obstruction of the duct. The second fixing zone being fixed to the sealed membrane, said second fixing zone follows the deformations of the sealed membrane so that this obstacle portion is present including during deformation of the sealed membrane. Moreover, this fixing of the first and second fixing zones provides a simple way to ignore tolerances of manufacture and/or of positioning of the thermally-insulating barrier and/or of the sealed membrane whilst preserving good obstruction of the duct.

In accordance with one embodiment, the first fixing zone and the second fixing zone are offset in the longitudinal direction of the duct. In other words, the first fixing zone and the second fixing zone are not contiguous so that the obstacle portion extends with a component parallel to the longitudinal direction of the duct.

In accordance with one embodiment, one end, preferable both opposite ends, of the first fixing zone and/or of the second fixing zone extend(s) from the duct so as to lie between the sealed membrane and the thermally-insulating barrier. The fixing of the first fixing zone and/or of the second fixing zone is therefore simple and reliable, said end being pinched between the sealed membrane and the thermally-insulating barrier.

In accordance with one embodiment, one end, preferably both opposite ends, of the first fixing zone and/or of the second fixing zone project(s) beyond the duct in such a manner as to lie between two contiguous portions of the sealed membrane, said two contiguous portions being connected in sealed manner. Fixing the first fixing zone and/or the second fixing zone is therefore simple and reliable, said end being pinched between said two contiguous portions of the sealed membrane.

In accordance with one embodiment, the obstacle portion is mobile relative to the bottom of the duct. In accordance with one embodiment, the obstacle portion is mobile relative to the sealed membrane. In other words, in accordance with one embodiment, the obstacle portion is free relative to the bottom of the duct and to the sealed membrane. The obstacle portion therefore obstructs the duct in a non-sealed manner and thus allows the circulation of inert gas in the duct whilst creating the pressure drop in the flow.

In accordance with one embodiment, the obstacle portion is deformable between the bottom of the duct and the sealed membrane. This deformability of the obstacle portion can be obtained in numerous ways. In accordance with one embodiment, the flexible film is made of an elastically-deformable material. In accordance with one embodiment, the obstacle portion has a length, when said obstacle portion is laid flat, greater than the distance between a fixing surface of the first fixing zone on the bottom of the duct and a fixing surface of the second fixing zone on the sealed membrane. In other words, in accordance with one embodiment, the obstacle portion is in a loose state in the duct, in particular at ambient temperature.

In accordance with one embodiment, the first fixing zone and the second fixing zone are situated at two opposite ends of the flexible film and are disposed at the same level in the longitudinal direction of the duct.

In accordance with one embodiment, the obstacle portion situated between the bottom of the duct and the sealed membrane is deformable and includes at least one fold along an axis transverse to the longitudinal direction of the duct.

The obstacle then has for example a particularly advantageous U shape suitable for installation in situ in the tank. An obstacle of this kind may be installed using a tool, for example a blade, enabling insertion of the obstacle in the duct without damaging it.

In accordance with one embodiment, the obstacle includes a compressible element that is preloaded and accommodated in the fold between the first and second fixing zones so as to exert a reaction force pressing the first fixing zone against the bottom of the duct and the second fixing zone against the external face of the sealed membrane delimiting the duct.

In accordance with one embodiment, the compressible element is made of a material chosen from wadding, felt, glass wool, rock wool, polymer foam, polyethylene wadding or other materials extending in the direction of the thickness between the first fixing zone and the second fixing zone. Thanks to this feature, fixing by gluing is facilitated.

In accordance with one embodiment, a non-stick film is inserted in the fold to prevent sticking together the two portions of the flexible film folded one on the other, for example because of any overspill of adhesives. The non-stick film may be a sheet of polyethylene or PTFE. In accordance with one embodiment, the non-stick film inserted in the fold has one end situated inside the fold and a second end situated outside the fold. This feature makes it possible to facilitate installation of the obstacle in the tank and to prevent any surplus adhesive interfering with installation of the obstacle. The non-stick film may be inserted alone or in combination with a compressible element. To facilitate installation of the obstacle in the tank the non-stick film and the flexible film may be folded successively around the edge at the end of the blade in order to push them into the duct.

In accordance with one embodiment, the obstacle portion includes two folds spaced from each other in the longitudinal direction of the duct, each fold being produced along an axis transverse to the lengthwise direction of the duct. The obstacle has for example a Z shape.

In accordance with one embodiment, the pressure-drop obstacle is made of a woven textile material and has a lengthwise direction extending between the first fixing zone and the second fixing zone, the fibers of the woven textile being oriented between 35° and 55° (degrees) relative to the lengthwise direction of the duct; preferably, the fibers of the woven textiles are oriented at 45° relative to the lengthwise direction of the duct. Thanks to this feature, the pressure-drop obstacle obtains flexibility via the deformation of the warp threads and the weft threads of the woven textile.

Thanks to these features, the obstacle portion makes it possible to follow variations of the relative positioning and of the dimensions of the thermally-insulating barrier and/or of the sealed membrane whilst obstructing the ducts effectively in order to create the pressure drop in a flow in said duct. In particular, a pressure-drop obstacle of this kind enables this effective obstruction of the duct including when the tank is cooled, that is say in the event of thermal contraction of the sealed membrane and of the thermally-insulating barrier and therefore of variation of the distance between the first fixing zone and the second fixing zone.

In accordance with one embodiment, the obstacle portion of the flexible film is a first obstacle portion, the flexible film includes a third fixing zone extending transversely to the longitudinal direction of the duct, the third fixing zone being fixed to the bottom of the duct, the second fixing zone being between the first fixing zone and the third fixing zone, the flexible film including a second obstacle portion extending from the second fixing zone to the third fixing zone, said second obstacle portion extending across the duct between the bottom of the duct and the secondary sealed membrane so as to create a pressure drop in the duct.

This kind of pressure drop obstacle enables good obstruction of the duct and therefore a high pressure drop in the flow.

In accordance with one embodiment, in the longitudinal direction of the duct the third fixing zone is opposite the first fixing zone and the second fixing zone.

In accordance with one embodiment, the second obstacle portion is mobile relative to the bottom of the duct.

In accordance with one embodiment, the second obstacle portion is mobile relative to the sealed membrane.

In other words, in accordance with one embodiment, the second obstacle portion is free relative to the bottom of the duct and to the sealed membrane. Thus the second obstacle portion obstructs the duct in a non-sealed manner and therefore allows the circulation of inert gas in the duct whilst creating the pressure drop in the flow.

In accordance with one embodiment, the second obstacle portion is deformable between the bottom of the duct and the sealed membrane. This deformability of the second obstacle portion may be obtained in numerous ways, for example in a manner analogous to the above examples for the first obstacle portion.

In accordance with one embodiment, the flexible film is made of a material chosen in the group consisting of glass matting, polyethylene film and/or polyamide film. For example, the film may be: a woven fabric based on glass, a woven fabric made of polyethylene, a woven fabric made of polyamide, a woven fabric made of polyimide, a woven fabric made of polyetherimide, this list being non-exhaustive. Materials of this kind have good resistance to cold whilst preserving a flexibility enabling the flexible film to follow deformations of the sealed membrane.

In accordance with one embodiment, the first fixing zone extends in a plane intersecting the longitudinal direction of the duct.

In accordance with one embodiment, the first fixing zone extends in a plane perpendicular to the longitudinal direction of the duct.

In accordance with one embodiment, the second fixing zone extends in a plane intersecting the longitudinal direction of the duct.

In accordance with one embodiment, the second fixing zone extends in a plane perpendicular to the longitudinal direction of the duct.

Anchor zones of this kind arranged perpendicularly to the longitudinal direction of the duct enable effective obstruction of the duct by the obstacle portion or portions.

In accordance with one embodiment, the first fixing zone and/or the second fixing zone is/are fixed by gluing.

In accordance with one embodiment, the tank includes a double-sided adhesive tape between the first fixing portion and the bottom of the duct in order to fix said first fixing portion to the bottom of the duct.

In accordance with one embodiment, the tank includes a double-sided adhesive tape between the sealed membrane and the second fixing zone in order to fix said second fixing zone to the sealed membrane. Adhesive tapes of this kind provide a simple and rapid way to fix the first and second fixing zones. Moreover, adhesive tapes of this kind enable simple fixing of the flexible film by simple application or pressure of the flexible film on said adhesive tapes or vice-versa.

In accordance with one embodiment, the pressure-drop obstacle is arranged in a fixed and reliable manner in the duct.

In accordance with one embodiment, the sealed and thermally-insulating tank includes a plurality of pressure-drop obstacles in the duct and along the longitudinal direction of the duct.

In accordance with one embodiment, the sealed and thermally-insulating tank includes a plurality of pressure-drop obstacles arranged in the duct along the longitudinal direction of the duct, said pressure-drop obstacles each including an anchor strip and a flexible portion, said pressure-drop obstacles extending between the bottom of the duct and the sealed membrane, the anchor strip extending in a direction intersecting the longitudinal direction of the ducts, the flexible portion including a plurality of flexible elements projecting from the anchor strip in the direction of the sealed membrane, a free end of the flexible elements opposite the anchor strip being in contact with the secondary sealed membrane in such a manner as to create a pressure drop for a flow circulating in the duct, said flexible elements being able to flex elastically in contact with the sealed membrane.

In accordance with one embodiment, the pressure-drop obstacles of the plurality of pressure-drop obstacles are arranged in the duct at regular intervals along the longitudinal direction of the duct.

In accordance with one embodiment, the pressure-drop obstacles of the plurality of pressure-drop obstacles are arranged in the duct at irregular intervals along the longitudinal direction of the duct.

In accordance with one embodiment, the pressure-drop obstacles of the plurality of pressure-drop obstacles arranged in the duct are identical.

In accordance with one embodiment, the pressure-drop obstacles of the plurality of pressure-drop obstacles are different and may correspond to different embodiments described in this text.

In accordance with one embodiment, the thermally-insulating barrier forming the bottom of the duct includes a plurality of spaced insulating panels, for example spaced regularly or irregularly, and a plurality of junction zones situated between the insulating panels, for example with a regular or irregular pitch between two junction zones. The obstacles may be arranged facing the insulating panels in such a manner that the junction zones at each end of a panel are located between the obstacles. For example the obstacles are spaced from one another by an interval corresponding to the regular or irregular pitch of the junction zones. In one embodiment at least one obstacle is disposed facing each insulating panel. There is therefore systematically at least one obstacle that blocks the flow between two successive junction zones.

In accordance with one embodiment, the pressure-drop obstacles are arranged at irregular intervals.

Thus flow in the duct is controlled along the length of the duct.

In accordance with one embodiment, the sealed and thermally-insulating tank includes a first tank wall and a second tank wall, the first tank wall and the second tank wall forming an edge of the thermally-insulating barrier, the first tank wall including a first anchor surface and the second tank work forming a second anchor surface, the bottom of the duct being formed by the thermally-insulating barrier between the first anchor surface and the second anchor surface, the bottom of the duct forming the edge, and the sealed membrane includes a sealed corner piece, the sealed corner piece including a first portion anchored to the first anchor surface and a second portion anchored to the second anchor surface, the sealed corner piece further including a central portion between the first portion and the second portion, said central portion being free relative to the thermally-insulating barrier in such a manner as to absorb by deformation the loads in the sealed membrane in line with the edge, the duct being delimited by the external face of the sealed corner piece.

In accordance with one embodiment, the sealed and thermally-insulating tank includes a corner structure, said corner structure including a first insulating panel and a second insulating panel, the first insulating panel forming one edge of the thermally-insulating barrier of the first tank wall, the second insulating panel forming one edge of the thermally-insulating barrier of the second tank wall, the first insulating panel and the second insulating panel together forming the edge, the corner structure further including a first sealed membrane portion and a second sealed membrane portion, the first sealed membrane portion resting on the first insulating panel, said first sealed membrane portion forming one edge of the sealed membrane of the first tank wall, the second sealed membrane portion resting on the second insulating panel, said second sealed membrane portion forming an edge of the sealed membrane of the second tank wall.

In accordance with one embodiment, the first sealed membrane portion includes a first composite film fixed to the first insulating panel and the second sealed membrane portion includes a second composite film fixed to the second insulating panel.

In accordance with one embodiment, the first sealed membrane portion includes a laminated composite sealed film including a metal foil between two layers of resin-coated fibers. In accordance with one embodiment, the first sealed membrane portion is glued to the first insulating panel. In accordance with one embodiment, the second sealed membrane portion includes a laminated composite sealed film including a metal foil between two layers of fibers coated with resin. In accordance with one embodiment, the second sealed membrane portion is glued to the second insulating panel.

In accordance with one embodiment, the first sealed membrane portion is a metal plate anchored to the first thermally-insulating barrier portion. In accordance with one embodiment, the second sealed membrane portion is a metal plate anchored to the second portion of the thermally-insulating barrier.

In accordance with one embodiment, the first insulating panel forms the first anchor surface. In accordance with one embodiment, the second insulating panel forms the second anchor surface.

In accordance with one embodiment, the first sealed membrane portion, for example an edge of said first sealed membrane portion, forms the first anchor surface. In accordance with one embodiment the second sealed membrane portion, for example an edge of said second sealed membrane portion, forms the second anchor surface.

The sealed corner piece may be fixed in numerous ways to the first and second anchor surfaces. In accordance with one embodiment, the sealed corner piece is glued to one of the or the first and second anchor surfaces. In accordance with one embodiment, the sealed corner piece is welded to one of the or the first and second anchor surfaces.

In accordance with one embodiment, the sealed corner piece includes a composite flexible sealed film, for example a laminated composite film including a metal foil between two layers of glass fibers.

In accordance with one embodiment, the sealed corner piece is a metal angle-iron.

Thanks to these features the corner of a sealed and thermally-insulating tank may be manufactured simply and rapidly with no risk of causing convection phenomena. In particular these features allow the use of a corner piece in the form of a metal angle-iron or a flexible sealed film for producing the sealed membrane in the corner of the tank whilst ensuring the absence of convection between the sealed membrane and the thermally-insulating barrier in said corner of the tank. In fact, in order to allow absorption of loads in the sealed membrane, for example when cooling the tank, a corner piece of this kind in the form of a metal angle-iron or a sealed film is not fixed to the thermally-insulating barrier at the level of the corner portion of the thermally-insulating barrier. Thus when cooling the tank the central portion of the corner piece is under tension because of the loads in said sealed membrane, for example loads linked to contraction of the sealed membrane or to contraction of the thermally-insulating barrier to which the sealed membrane is anchored. This moves said portion away from the corner portion of the thermally-insulating barrier and therefore causes a duct to appear or to be enlarged in section between said corner portion of the thermally-insulating barrier and the central portion of the corner piece. The presence of the pressure-drop obstacle in this duct makes it possible to avoid the phenomena of convection in this duct.

In accordance with one embodiment, the sealed and thermally-insulating tank further includes a stop, said stop including a first external face resting against the thermally-insulating barrier of the first tank wall and an external second face resting against the thermally-insulating barrier of the second wall of the tank, the stop further including a concave internal face, the duct being delimited by the internal face of the stop.

A tank of this kind may be part of a terrestrial storage installation, for example one for storing LNG, or be installed in a coastal or deep water floating structure, in particular a methane tanker, a floating storage and regasification unit (FSRU), a floating production storage and offloading (FPSO) unit, etc. A tank of this kind may also serve as a reservoir of fuel in any type of ship.

In accordance with one embodiment, the invention also provides a ship for transporting a cold liquid product, including a double hull and an aforementioned tank disposed in the double hull.

In accordance with one embodiment, the invention also provides a method of loading or offloading a ship of this kind in which a cold liquid product is routed through insulated pipes from or to a floating terrestrial storage installation to or from the tank of the ship.

In accordance with one embodiment, the invention also provides a transfer system for a cold liquid product, the system including the aforementioned ship, insulated pipes arranged in such a manner as to connect the tank installed in the hull of the ship to a floating or terrestrial storage installation, and a pump for driving a flow of cold liquid product through the insulated pipes to or from the floating or terrestrial storage installation to or from the tank of the ship.

BRIEF DESCRIPTION OF THE DRAWINGS

The invention will be better understood and other aims, details, features and advantages thereof will become more clearly apparent in the course of the following description with reference to the appended drawings of particular embodiments of the invention provided by way of non-limiting illustration only.

FIG. 3 is a view to a larger scale of the detail 38 from FIG. 2 illustrating an edge of the secondary thermally-insulating barrier and the secondary sealed membrane;

FIG. 4 is a schematic perspective view of a pressure-drop obstacle including blades that can be used in the corner of the tank from FIG. 2;

FIG. 5 is a schematic perspective view of a pressure-drop obstacle in accordance with one embodiment including blades and a woven fabric;

FIG. 6 is a schematic perspective view of a corner structure that can be used in the tank illustrated in FIG. 1;

DETAILED DESCRIPTION OF THE PREFERRED EMBODIMENTS

Figure 1:
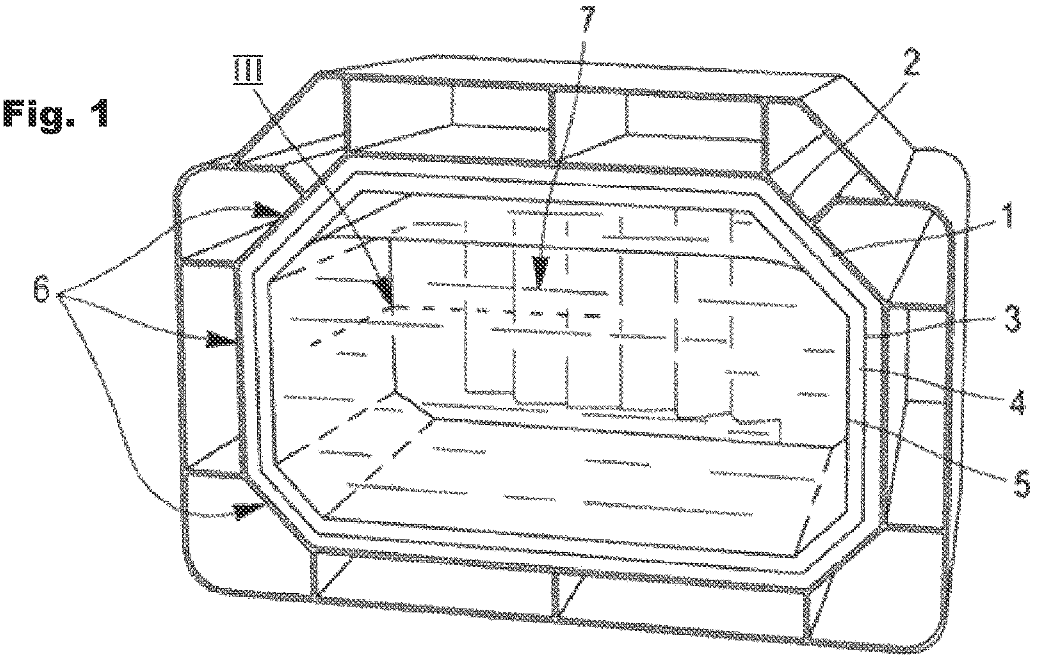
FIG. 1 is a schematic view in section and in perspective of a sealed and thermally-insulating tank portion arranged in a supporting structure.

By convention, the terms "external" and "internal" are used to define the relative position of one element with respect to another with reference to the interior and to the exterior of the tank.

A sealed and thermally-insulating tank for storing and transporting a cryogenic fluid, for example liquefied natural gas (LNG), includes a plurality of tank walls each having a multilayer structure.

A tank wall of this kind includes, from the exterior to the interior of the tank, a secondary thermally-insulating barrier 1 anchored to a supporting structure 2 by secondary retaining members, a secondary sealed membrane 3 carried by the secondary thermally-insulating barrier 1, a primary thermally-insulating barrier 4 resting on the secondary sealed membrane 3, and a primary sealed membrane 5 carried by the primary thermally-insulating barrier 4 and intended to be in contact with the cryogenic fluid contained in the tank.

The supporting structure 2 may in particular be a self-supporting metal plate or, more generally, any type of rigid partition having appropriate mechanical properties. The supporting structure 2 may in particular be formed by the hull or the double hull of a ship, as illustrated in FIG. 1. The supporting structure 2 includes a plurality of walls defining the general shape of the tank, usually a polyhedral shape. Some tanks may include only one thermally-insulating barrier and one sealed membrane, for example for storing LPG.

As illustrated in FIG. 1 the tank, here of polyhedral shape, includes lateral tank walls 6 and transverse walls 7 (only one transverse wall being illustrated in FIG. 1) that have a vertical component, that is to say a component parallel to the direction of terrestrial gravity. In tank walls 6, 7 of this kind having a vertical component the presence of ducts extending over all the height of the tank wall 6, 7 is likely to favour phenomena of natural convection. In fact, in tank walls 6, 7 of this kind thermosyphon phenomena may occur which leads to deterioration of the insulating performance of the thermally-insulating barriers 1, 4. One aspect of the invention starts from the idea of limiting or even eliminating these natural convection phenomena.

Figure 2:
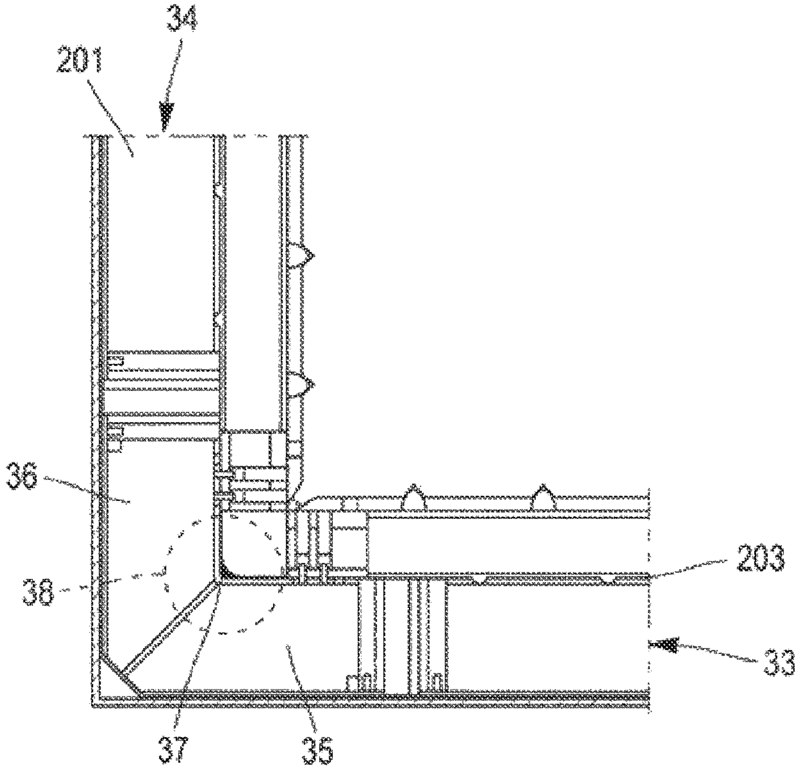
FIG. 2 is a view in section of a corner of the sealed and thermally-insulating tank taken on the section plane Ill in FIG. 1.

As illustrated in FIG. 2, the secondary thermally-insulating barrier 201 includes a first corner insulating panel 35 forming one edge of the secondary thermally-insulating barrier 201 of the first tank wall 33. Likewise, the secondary thermally-insulating barrier 201 includes a second corner insulating panel 36 forming an edge of the secondary thermally-insulating barrier 201 of the second tank wall 34. The first corner insulating panel 35 and the second corner insulating panel 36 form an edge 37 of the secondary thermally-insulating barrier 201 at the level of a corner of the secondary thermally-insulating barrier 201 formed by the junction of the first tank wall 33 and the second tank wall 34.

The term "edge" denotes the junction zone between the two tank walls, which may have different shapes with greater or lesser curvature. It therefore encompasses a sharp edge, a rounded edge and a fillet.

As illustrated in FIGS. 2 and 3 the secondary thermally-insulating barrier 201 includes a first corner insulating panel 35 forming one edge of the secondary thermally-insulating barrier 201 of the first tank wall 33. Likewise, the secondary thermally-insulating barrier 201 includes a second corner insulating panel 36 forming an edge of the secondary thermally-insulating barrier 201 of the second tank wall 34. The first corner insulating panel 35 and the second corner insulating panel 36 form an edge 37 of the secondary thermally-insulating barrier 201 at the level of a corner of the secondary thermally-insulating barrier 201 formed by the junction of the first tank wall 33 and the second tank wall 34.

An internal face of the first corner insulating panel 35 forms a first anchor zone 39 and an internal face of the second corner insulating panel 36 forms a second anchor zone 40. The first anchor zone 39 is on the internal face of the first corner insulating panel 35 at a distance from the edge 37 and, likewise, the second anchor zone 40 is on the internal face of the second corner insulating panel 36 at a distance from the edge 37. These first and second anchor zones 39 and 40 include a metal plate (not illustrated).

In order to assure the continuity of the secondary sealed membrane 203 between the first tank wall 33 and the second tank wall 34 the secondary sealed membrane 203 includes a corner piece. A corner piece of this kind is, for example, a metal angle-iron 41. This angle-iron 41 enables connection in sealed manner of a portion of the secondary sealed membrane 203 that is part of the first tank wall 33 and a portion of the secondary sealed membrane 203 that is part of the second tank wall 34.

A first portion 42 of the angle-iron 41 is anchored in sealed manner to the first anchor zone 39 and a second portion 43 of the angle-iron 41 opposite the first portion 42 is anchored in sealed manner to the second anchor zone 40. The anchoring of the first and second portions 42 and 43 of the angle-iron 41 to the metal plate forming the first and second anchor zones 39 and 40 may be direct, for example by direct welding to said metal plate, or indirect, for example by overlap welding to a portion of the secondary sealed membrane 203 carried by the corresponding tank wall that is between the portion 42 or 43 of the angle-iron 41 and the corresponding anchor zone 39 or 40.

In order to absorb loads in the secondary sealed membrane 203 at the level of the corner, in particular at the level of the edge 37, a central portion 44 of the angle-iron 41 between the first portion 42 and the second portion 43 is left free relative to the secondary thermally-insulating barrier 201. Accordingly, when the tank is cooled, the first and second anchor portions 42, 43 of the angle-iron 41 remain anchored to the anchor zones 39 and 40 of the secondary thermally-insulating barrier 201 and the loads, such as the loads stemming from contraction of the secondary sealed membrane 203 or the secondary thermally-insulating barrier 201 distancing the anchor zones 39, 40 from one another, at the level of the corner, are absorbed by deformation of the central portion 44 of the angle-iron 41. In particular, the central portion 44 extends between the first and second portions 42 and 43 of said angle-iron 41 so that said central portion 44 moves away from the edge 37 on deforming. This separation between the central portion 44 of the angle-iron 41 and the edge 37 produces or enlarges a duct between the secondary thermally-insulating barrier 201 and the angle-iron 41 of the secondary sealed membrane 203. This duct extends over all the length of the edge 37, parallel to the vertical direction of the tank and therefore, as explained hereinabove, liable to favour natural convection and to degrade the insulating performance of the tank.

Moreover, the sealed membrane illustrated in FIGS. 2 and 3 may be produced by a composite sheet that is stuck on instead of a metal membrane that is welded on. In this case the metal angle-iron 41 may be replaced by a flexible composite sheet 41, for example a laminated sealed film including a metal foil between two layers of fiber such as glass fiber, for example. A corner piece in the form a flexible composite sheet 41 may for example have a first portion stuck to the first anchor zone of the thermally-insulating barrier and a second portion glued to the second anchor zone of the thermally-insulating barrier. The central portion of a flexible composite sheet 41 of this kind is then left free relative to the corner portion of the thermally-insulating barrier and the pressure-drop obstacle would be arranged in an analogous manner between said central portion of the flexible composite sheet and the thermally-insulating barrier. A secondary sealed membrane including this kind of flexible composite sheet at the level of a corner of the tank is for example described in the document WO2014167214.

In this case also, contraction of the flexible composite sheet 41 in line with the edge 37 produces or enlarges a duct between the secondary thermally-insulating barrier 201 and the secondary sealed membrane 203.

In order to prevent this a pressure-drop obstacle 217 is disposed in the duct, as illustrated in FIG. 3. The pressure-drop obstacle 217 is illustrated in FIG. 4.

The pressure-drop obstacle 217 takes the form of a sheet 132 that includes a continuous lower portion forming the anchor strip 224 and regularly spaced blades 229 over all its width. The blades 229 are flexible and in the same plane when at rest. Each blade 229 has a first end 330 continuous with the anchor strip 224 and a free second end 331.

The anchor strip 224 is fixed to a corner portion of the secondary thermally-insulating barrier formed by the internal face of the first corner insulating panel 35 between the first anchor zone 39 and the edge 37 and the internal face of the second corner insulating panel 36 between the second anchor zone 40 and the edge 37. This corner portion typically forms the bottom 220 of the duct.

The first corner insulating panel 35 and the second corner insulating panel 36 include a slot (not illustrated) extending in the thickness of the internal plate of said corner insulating panels 35, 36 from the first anchor zone 39 or the second anchor zone 40 as far as a plane 45 of contact between said corner insulating panels 35, 36. In other words, slots of this kind are advantageously contiguous at the level of the junction plane 45 between the corner insulating panels 35, 36 in order together to form a housing for the pressure-drop obstacle 217, a pressure-drop obstacle 217 of this kind in the form of a sheet having a shape that is simple to manufacture and that is simple to insert in said housing.

Pressure-drop obstacles 217 of this kind are preferably installed by prefabrication during the fabrication of a corner insulating block formed of the first corner insulating panel 35 and the second corner insulating panel 36. When installing the corner angle-iron 41, the blades 229 are deformed by the angle-iron 41 or the flexible composite sheet 41 bearing on said blades 229. Moreover, during cooling of the tank causing an increase in the section of the duct, the load exerted by the angle-iron 41 or the flexible composite sheet 41 on the blades 229 is reduced and the elasticity and the length of the blades 229 allow said blades 229 to accompany the increase in the section of the duct by maintaining contact with the external surface of the angle-iron 41 or the flexible composite sheet 41 in order to obstruct said duct.

FIG. 5 shows another embodiment of a pressure-drop obstacle 317 further including a woven fabric. In this embodiment the pressure-drop obstacle 317 takes the form of a sheet 132 covered in part by a woven fabric 50. The sheet 132 includes a continuous lower portion forming the anchor strip 324. Each blade 329 has a first end 330 contiguous with the anchor strip 324 and a free second end 331. The blades 329 are regularly spaced from one another over all the width of the sheet 132. The woven fabric 50 of the pressure-drop obstacle 317 overlaps and is stuck to the anchor strip 324 and the blades 329. The woven fabric 50 has an excess length so as to form expansion bellows 82 in line with the separations between the blades 329. The blades 329 therefore remain relatively uncoupled from one another in bending.

Referring to FIGS. 6 to 9 there will now be described another embodiment of the corner of the tank in which a convection duct may appear in a similar manner.

At the level of the junction between a first wall 8 of the tank, for example a lateral wall 6, and a second wall 9 of the tank, for example a transverse wall 7, the tank includes a corner structure 51 illustrated in FIG. 6. This corner structure 51 is advantageously prefabricated.

The corner structure 51 illustrated in FIG. 6 includes a first corner secondary insulating panel 52 and a second corner secondary insulating panel 53. The corner secondary insulating panels have, from the exterior of the tank to the interior of the tank, a rigid external plate 54, an insulating packing 55 and a rigid internal plate 15. The first corner secondary insulating panel 52 and the second corner secondary insulating panel 53 also have a bevelled face, the bevelled faces of said two corner secondary insulating panels 52, 53 being contiguous. Accordingly, as illustrated in detail in FIG. 7, the corner secondary insulating panels form an edge 16 of the secondary thermally-insulating barrier 1.

The first corner secondary insulating panel 52 carries a first secondary sealed membrane portion 56 and the second corner secondary insulating panel 53 carries a second secondary sealed membrane portion 18. These first and second secondary sealed membrane portions 56, 18 may be produced in numerous ways. In one embodiment the first and second secondary sealed membrane portions 56, 18 are made of laminated sealed film. Laminated sealed film of this kind includes a metal, for example aluminium, sheet between two layers of fibers coated with resin. Secondary sealed membrane portions 56, 18 made of laminated sealed film of this kind are for example stuck to the internal face of the corner secondary insulating panels 52, 53. In another embodiment the first and second secondary sealed membrane portions 56, 18 are metal plates anchored on the corner secondary insulating panels 52, 53.

Figure 7:
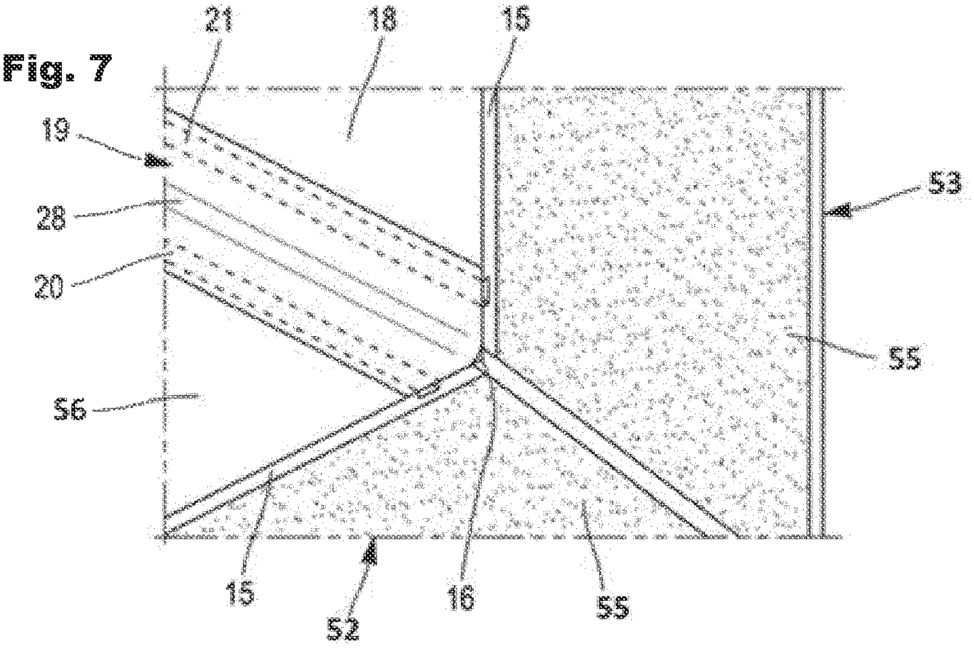
FIG. 7 is an enlarged detail view of the corner structure in FIG. 6 at the level of an edge of the secondary thermally-insulating barrier.

As illustrated in FIG. 7 the secondary sealed membrane portions 56, 18 have a longitudinal edge extending parallel to the edge 16 of the secondary thermally-insulating barrier 1, said edge being at a distance from the edge 16. The first secondary sealed membrane portion 56 typically forms an edge of the secondary sealed membrane 3 of the first wall 8 and the second secondary sealed membrane portion 18 typically forms an edge of the secondary sealed membrane 3 of the second wall 9.

In order to seal the secondary sealed membrane 3 in the corner of the tank the corner structure 51 includes a corner secondary sealed membrane portion 19. This corner secondary sealed membrane portion 19 connects in sealed manner the first secondary sealed membrane portion 56 and the second secondary sealed membrane portion 18. This corner secondary sealed membrane portion may be produced in numerous ways. In one embodiment the corner secondary sealed membrane portion 19 is made of laminated sealed film, for example including a metal foil between two layers of fibers not coated with resin. A corner secondary sealed membrane portion 19 made of laminated sealed film of this kind is for example glued to the first and second secondary sealed membrane portions 56, 18.

In accordance with another embodiment the corner secondary sealed membrane portion 19 is formed by a metal angle-iron anchored in sealed manner to the first and second secondary sealed membrane portions 56, 18.

As illustrated in detail in FIG. 7 the corner secondary sealed membrane portion 19 extends along the edge 16. The corner secondary sealed membrane portion 19 has longitudinal edges parallel to the edge 16. A first longitudinal edge of the corner secondary sealed membrane portion 19 forms a first anchor zone 20, illustrated in dashed line in FIG. 7, which is fixed in sealed manner to the first secondary sealed membrane portion 56. Likewise, a second longitudinal edge of the corner secondary sealed membrane portion 19 forms a second anchor zone 21, illustrated in dashed line in FIG. 7 that is fixed in sealed manner to the second secondary sealed membrane portion 18.

The fixing in sealed manner of the anchor zones 20, 21 of the corner secondary sealed membrane portion 19 to the secondary sealed membrane portions 56, 18 may be obtained in numerous ways, for example by gluing in the case of a corner secondary sealed membrane portion 19 in the form of a laminated sealed film or by welding in the case of a corner secondary sealed membrane portion 19 in the form of a metal angle-iron. The internal rigid plate 15 of the corner secondary insulating panels 52, 53 may include a thermal protection band accommodated in a recess in order to protect said corner secondary insulating panels 52, 53 when carrying out such welding.

The corner structure 51 further includes a plurality of primary insulating elements 22 juxtaposed along the edge 16 of the secondary thermally-insulating barrier 1. Each primary insulating element 22 includes a first primary insulating block 23 resting on the first secondary sealed membrane portion 56 and a second primary insulating block 24 resting on the second secondary sealed membrane portion 18. The plurality of primary insulating elements 22 forms the primary thermally-insulating barrier 4.

The primary sealed membrane 5 includes a plurality of metal corner angle-irons 25 each resting on a respective primary insulating block 23, 24. Accordingly, each metal angle-iron includes a first flange 26 resting on the first primary insulating block 23 of a primary insulating element 22 and a second flange 27 resting on the second primary insulating block 24 of said primary insulating element 22.

The corner secondary sealed membrane portion 19 includes a central zone 28 between the first anchor zone 20 and the second anchor zone 21. This central zone 28 is arranged in line with the edge 16 and extends along the edge 16. This central zone 28 is not fixed to the secondary thermally-insulating barrier 1. In other words, the central zone 28 is free relative to the secondary thermally-insulating barrier 1 and more particularly relative to the edge 16. Other details and features of a corner structure of this kind are described for example in the document WO2014167214A2.

Figure 8:
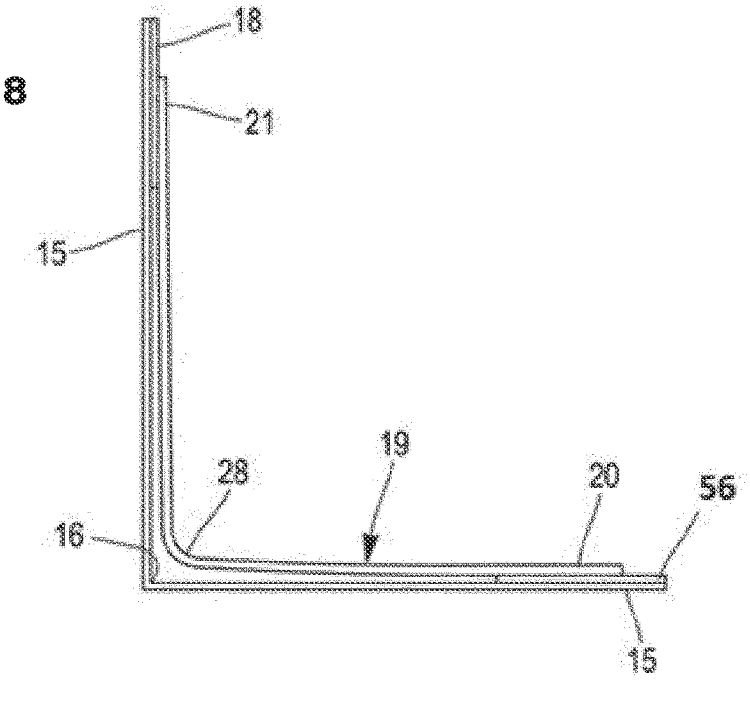
FIG. 8 is a schematic representation in section illustrating the secondary sealed membrane and the secondary thermally-insulating barrier at the level of the corner of the sealed and thermally-insulating tank at ambient temperature.

The absence of fixing of the central zone 28 of the corner second sealed membrane portion 19 to the secondary thermally-insulating barrier 1 makes it possible to absorb the loads to which the second sealed membrane 3 is subjected in line with the edge 16. In fact, as illustrated in FIG. 8, when the tank is constructed the corner secondary sealed membrane portion 19 is arranged so that the central zone 28 is as close as possible to edge 16. This arrangement makes it possible to limit the presence of an empty space favouring convection between the secondary sealed membrane 3 and the secondary thermally-insulating barrier 1.

Figure 9:
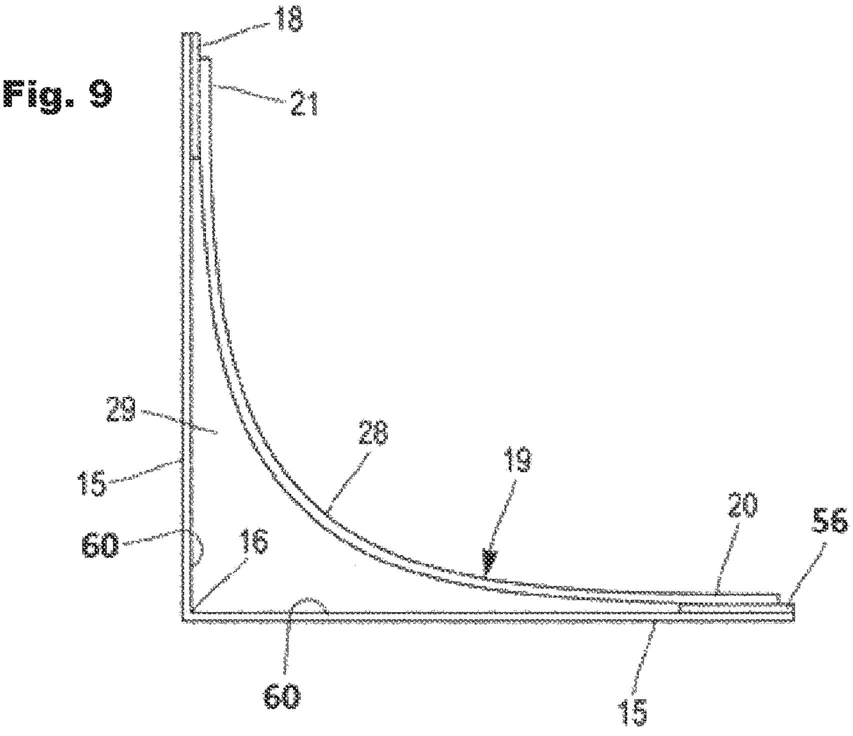
FIG. 9 is a view analogous to FIG. 8 in the tank containing a cryogenic liquid.

However, during cooling of the tank, the secondary sealed membrane 3 and therefore the corner secondary sealed membrane portion 19 contract, which causes deformation of said corner secondary sealed membrane portion 19 as illustrated in FIG. 9. Likewise, the corner secondary insulating panels 52, 53 contract, which moves the anchor zones 20, 21 of the corner secondary sealed membrane portion 19 away from one another and therefore also bring about deformation of said corner secondary sealed membrane portion 19.

As illustrated in FIG. 9, this deformation of the corner secondary sealed membrane portion 19 moves the central zone 28 away from the edge 16, which significantly increases the volume of empty space between the corner secondary sealed membrane portion 19 and the secondary thermally-insulating barrier 1 at the level of the edge 16. A duct 29 therefore appears or increases in size between the secondary sealed membrane 3 and the secondary thermally-insulating barrier 1. This duct 29 extends over all the length of the edge 16 present in a longitudinal direction parallel to the edge 16. This duct is typically delimited by an external face of the central portion 28 of the corner secondary sealed membrane portion 19 and by a portion of the internal faces of the rigid plates 15 of the corner secondary insulating panels 52, 53 between the edge 16 and the first and second secondary sealed membrane portions 56 and 18, said portion of the internal faces of the rigid plates 15 forming a bottom 60 of the duct 29.

To prevent convection in the duct 29 the tank includes a pressure-drop obstacle. A pressure-drop obstacle of this kind is arranged in the duct 29 between an internal face of the secondary thermally-insulating barrier 1 and an external face of the secondary sealed membrane 3. It may be produced in various ways.

Figure 10:
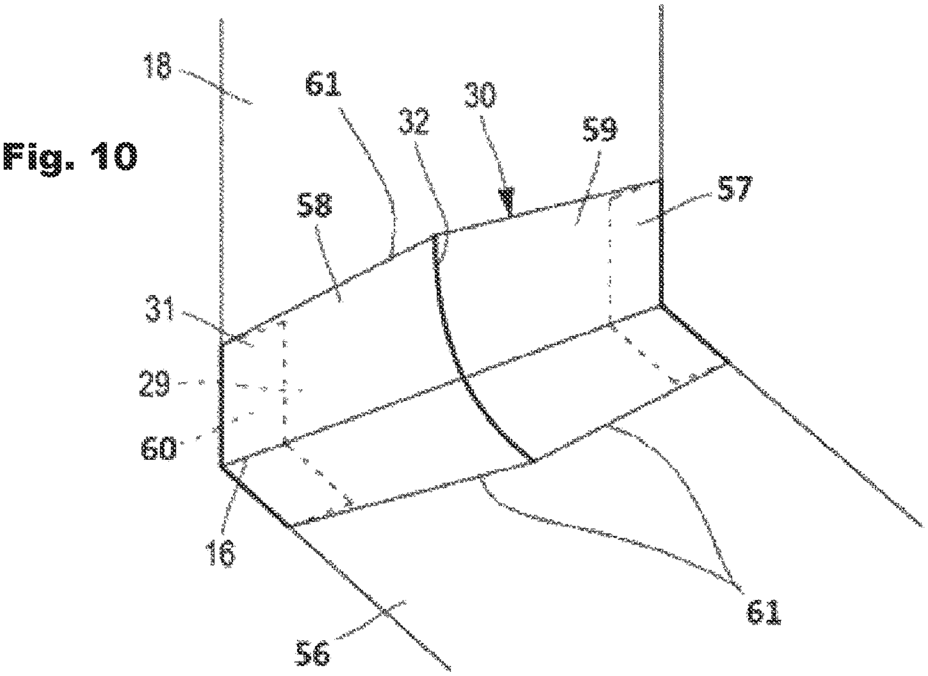
FIG. 10 is a schematic representation in perspective illustrating a pressure-drop obstacle fixed to the secondary thermally-insulating barrier at the level of the edge formed by said secondary thermally-insulating barrier.

FIG. 10 illustrates one embodiment of a pressure-drop obstacle of this kind. This pressure-drop obstacle is produced in the form of a flexible film 30.

The flexible film 30 may be made of numerous materials, for example thermoplastic materials including polyethylene (PE), polyethylene terephthalate (PET), polyamide, polyimide, polyetherimide, polypropylene in the form of a textile or other film or any other material or textile having flexibility at low temperature. The pressure-drop obstacle may equally be made of woven textile, possibly coated. The woven textile may be based on different types of fibers, for example mineral fibers, such as glass fibers, basalt fibers, or natural fibers, for example based on hemp, flax or wool or a thermoplastic (PE, PET, PP, PI, PEI, . . . ).

The flexible film 30 illustrated in FIG. 10 includes a first fixing zone 31, a second fixing zone 32 and a third fixing zone 57. The first fixing zone 31 and the third fixing zone 57 are formed at the level of two opposite edges of the flexible film 30. These first and third fixing zones 31, 57 are for example formed by opposite transverse edges of the flexible film 30.

The second fixing zone 32 lies between the first fixing zone 31 and the third fixing zone 57, for example at substantially equal distances from the first and third fixing zones 31 and 57.

The flexible film 30 also includes a first obstacle portion 58 between the first fixing zone 31 and the second fixing zone 32 and a second obstacle portion 59 between the second fixing zone 32 and the third fixing zone 57.

The first fixing zone 31 and the third fixing zone 57 are fixed to the secondary thermally-insulating barrier 1. To be more specific, the first fixing zone 31 and the third fixing zone 57 are fixed to the bottom 60 of the duct 29 in such a manner as to extend transversely, preferably perpendicularly, to the longitudinal direction of the duct 29.

This fixing of the first and third fixing zones 31 and 57 to the bottom 60 of the duct 29 may be effected in numerous ways. This fixing is for example effected by gluing or by means of a double-sided adhesive tape, for example containing polytetrafluoroethylene (PTFE), lying between each of said first and third fixing zones 31 and 57 and the bottom 60 of the duct 29.

The second fixing zone 32 is fixed to the external face of the central portion 28 of the corner secondary sealed membrane portion 19. In an analogous manner to the fixing of the first and third fixing zones 31 and 57, the second fixing zone 32 may be fixed in numerous ways, for example by gluing or by means of a double-sided adhesive tape between the second fixing zone 32 and the external face of the central zone 28 of the corner secondary sealed membrane portion 19.

In accordance with one embodiment, installing the flexible film 30 in the tank includes first fixing the first and third fixing zones 31 and 57 to the bottom 60 of the duct 29 by gluing or by means of an adhesive tape. Moreover, a double-sided adhesive tape is applied to the external face of the central portion 28 of the corner second sealed membrane portion 19 at the location where the second fixing zone 32 must be fixed. The corner secondary sealed membrane portion 19 with said double-sided adhesive tape on it is then anchored to the first and second secondary sealed membrane portions 56 and 18. Anchoring the corner secondary sealed membrane portion to said secondary sealed membrane portions 56 and 18 brings the double-sided adhesive tape against the second fixing zone 32 and therefore fixes said second fixing zone 32 to the corner secondary sealed membrane portion 19. In the context of a laminated sealed film corner secondary sealed membrane portion, pressure exerted on an internal face of said laminated sealed film in line with the double-sided adhesive tape can improve the fixing of the second fixing zone 32 to said laminated sealed film.

The first obstacle portion 58 and the second obstacle portion 59 are free relative to the secondary thermally-insulating barrier 1 and the secondary sealed membrane 3. In other words, said first and second obstacle portions 58 and 59 are not fixed either to the secondary thermally-insulating barrier 1 or to the secondary sealed membrane 3. The longitudinal edges 61 of the obstacle portions 58 and 59 are therefore loose and enable on the one hand reduced circulation of gas in the duct 29, that is to say with a pressure drop linked to the arrangement of said obstacle portions 58 and 59 in the duct 29, and, on the other hand, deformation of the flexible film 30 to accompany the deformation of the corner secondary sealed membrane portion 19.

In fact, as explained hereinabove with reference to the figures, during cooling of the tank the corner secondary sealed membrane portion 19 is stretched. During this stretching of the corner secondary sealed membrane portion 19 the second fixing zone 32 of the flexible film 30 fixed to the central zone 28 of the corner secondary sealed membrane portion 19 accompanies the variation of the position of said central zone 28 linked to the deformation of the corner secondary sealed membrane portion 19. The first and third fixing zones 31 and 57 of the flexible film 30 are fixed to the secondary thermally-insulating barrier 1, the obstacle portions 58 and 59 of the flexible film 30 are in tension between said fixing zones 31, 32 and 57 and extend in the duct 29 between the secondary thermally-insulating barrier 1 and the secondary sealed membrane 3. The duct 29 is therefore obstructed by the first obstacle portion 58 and the second obstacle portion 59 between the central zone 28 of the corner secondary sealed membrane portion 19 and the secondary thermally-insulating barrier 1 whilst enabling a circulation of gas with a pressure drop in the flow.

The accompanying of the variation of position of a corner secondary sealed membrane portion 19 by the second fixing zone 32 is facilitated if the flexible film 30 has good flexibility at low temperature. Accordingly, as represented in FIG. 10, when the tank is cooled the obstacle portions 58 and 59 can deform slightly and take on a conical shape.

Pressure-drop obstacles of this kind are advantageously arranged in the tank at the level of corners of the tank the edge 16 of which has a component parallel to terrestrial gravity, typically between the lateral walls 6 and the transverse walls 7 of the tank. Pressure-drop obstacles of this kind may equally be arranged in a tank at the level of corners of the tank the edge 16 of which is perpendicular to terrestrial gravity. Moreover, a plurality of pressure-drop obstacles may be arranged, for example at regular intervals, along the duct 29, thus controlling the pressure drop along the duct 29.

Figure 11:
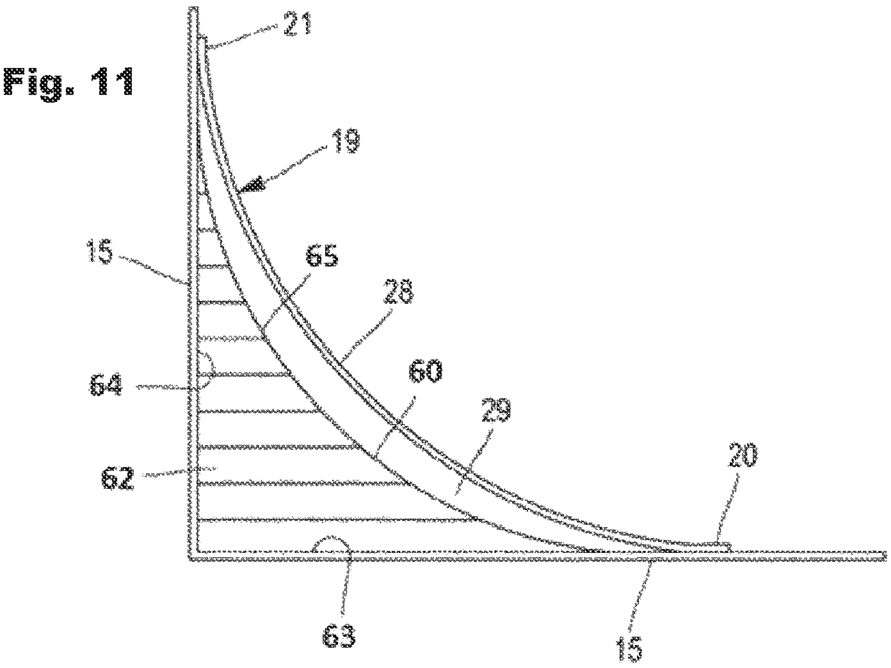
FIG. 11 is a view analogous to FIG. 9 representing a variant of the corner of the sealed and thermally-insulating tank.

FIG. 11 illustrates an embodiment in which the corner secondary sealed membrane portion 19 is formed by a laminated sealed film stuck to the first and second secondary sealed membrane portions 56 and 18 and in which the tank further includes a stop 62 for positioning the corner secondary sealed membrane portion 19.

A stop 62 of this kind is arranged on the bottom 60 of the duct 29, along the edge 16, and has a first face 63 resting on the internal rigid plate 15 of a corner secondary insulating panel and a second face 64 resting on the internal rigid plate 15 of a corner secondary insulating panel. This stop 62 further includes an internal face 65 connecting the first and second faces 63 and 64 of the stop 62. This internal face 65 has a concave shape the cavity of which faces toward the interior of the tank.

During installation of the corner secondary sealed membrane portion 19 the central zone 28 of said corner secondary sealed membrane portion 19 is arranged in such a manner as to rest on the internal face 65 of the stop 62. The corner secondary sealed membrane portion 19 is therefore easily positioned for gluing the first and second fixing zones 20 and 21 to the first and second secondary sealed membrane portions 56 and 18, respectively.

A stop 62 of this kind therefore makes it possible to control the radius of curvature of the central zone 28 of the corner secondary sealed membrane portion 19 when gluing said corner secondary sealed membrane portion 19, typically during fabrication of the tank. A stop 62 of this kind further enables reduction of the dimensions of the duct 29, but is not able to prevent enlargement of said duct 29 during cooling of the tank, as illustrated by the corner secondary sealed membrane portion 19 illustrated in this FIG. 11 under tension linked to thermal contraction, as explained hereinabove. In a duct 29 of this kind the internal face 65 then forms the bottom 60 of said duct 29.

In the presence of a stop 62 of this kind the first fixing zone 31 and the third fixing zone 57 of the pressure-drop obstacle can be fixed directly to the internal face 65 of the stop 62.

In one embodiment a first end of one or more of the fixing zones 31, 32 and/or 57 of the flexible film 30 lies between the first sealed membrane portion 56 and the first anchor zone 20 of the corner secondary sealed membrane portion 19. Likewise, a second edge of one or more fixing zones 31, 32 and/or 57 lie(s) between the second secondary sealed membrane portion 18 and the second anchor zone 21 of the corner secondary sealed membrane portion 19. These edges of said fixing zones 31, 32 and/or 57 are therefore and typically pinched between the first and second secondary sealed membrane portions 56 or 18 and the corner secondary sealed membrane portion 19, thus providing a simple way of fixing the fixing zones 31, 32 and/or 57.

Figure 12:
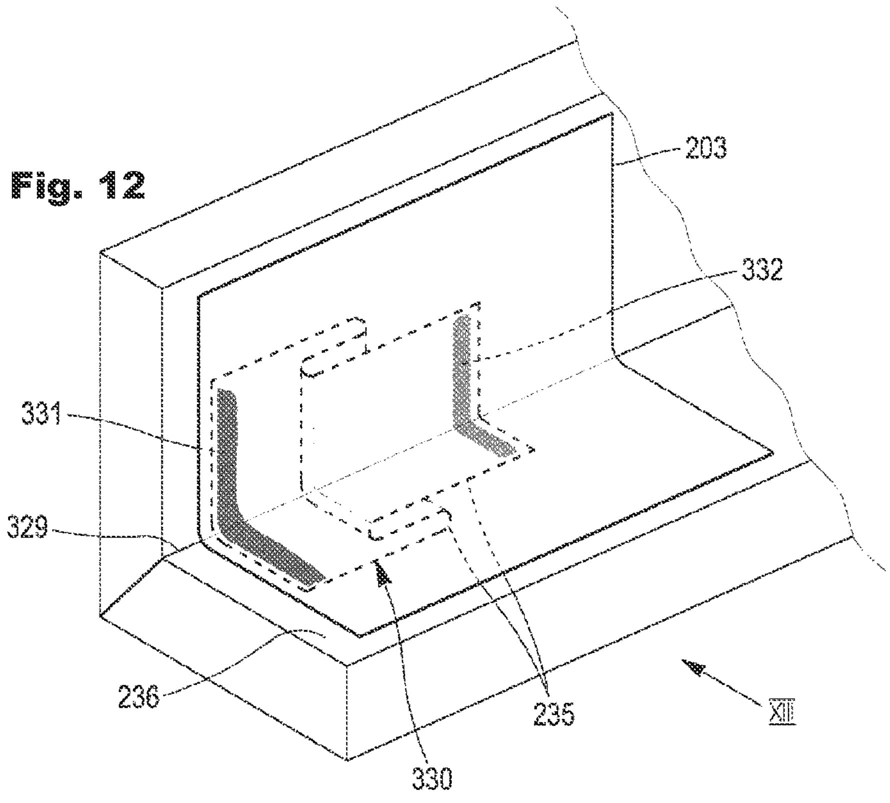
FIG. 12 is a schematic view in perspective illustrating the corner of the sealed and thermally-insulating tank provided with a pressure-drop obstacle in accordance with a further embodiment.
Figure 13:
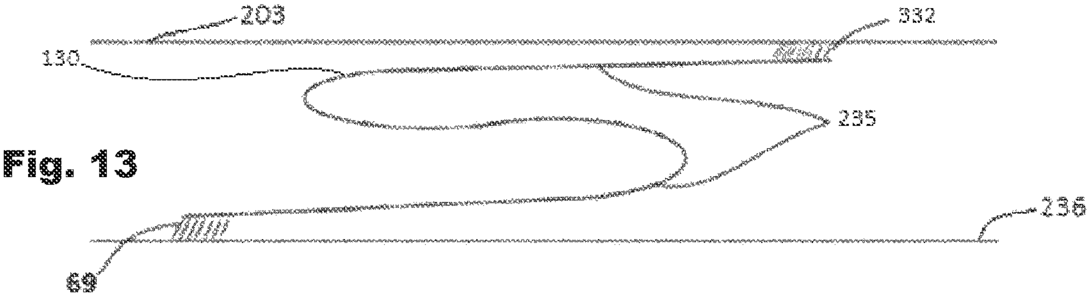
FIG. 13 is a lateral view of the pressure-drop obstacle in the direction of the arrow XIII in FIG. 12.

In an embodiment illustrated in FIGS. 12 and 13 the pressure-drop obstacle takes the form of a flexible film 130 that includes a first fixing zone 69 and a second fixing zone 332. The first fixing zone 69 and the second fixing zone 332 are formed at the level of two opposite edges of the flexible film. The first fixing zone 69 is fixed to a bottom 236 of the duct 68. The second fixing zone 332 is fixed to an external face of the secondary sealed membrane 203. The first fixing zone 69 and the second fixing zone 332 are offset in the longitudinal direction of the duct 68. In other words, the first fixing zone and the second fixing zone are not face to face, with the result that the obstacle portion 235 extends with a component parallel to the longitudinal direction of the duct 68. The obstacle portion 235 includes two spaced folds and therefore has a Z shape.

In order to facilitate integration of the obstacle in the tank a prefabricated pressure-drop obstacle 130 may be installed in the corner structure 51 before placing the corner structure 51 in the sealed and thermally-insulated tank. The structure of the obstacle 130 is simpler to fit during prefabrication in the factory of the panels with a portion of the sealed membrane covering them.

Figure 14:
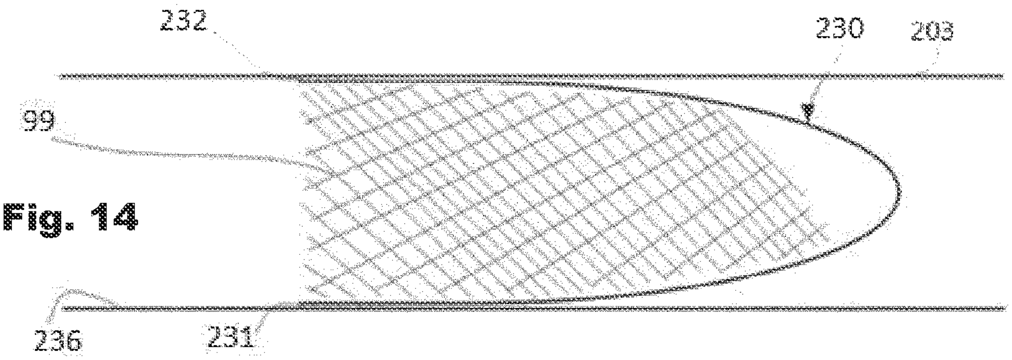
FIG. 14 is a view analogous to FIG. 13 of a pressure-drop obstacle in accordance with another embodiment.

In an embodiment illustrated in FIG. 14 the pressure-drop obstacle also takes the form of a flexible film 230 substantially in the shape of a U that is folded about an axis transverse to the longitudinal direction of the duct. The obstacle 230 includes a first fixing zone 231, a second fixing zone 232 and an obstacle portion folded on itself. The first fixing zone 231 and the second fixing zone 232 are formed at the level of two opposite edges of the flexible film. The first fixing zone 231 is fixed to a bottom 236 of the duct. The second fixing zone 232 is fixed to an external face of the sealed membrane 203. The first fixing zone 231 and the second fixing zone 232 are face to face. When the obstacle portion is arranged in a plane, the flexible film has a length greater than the distance between a fixing surface of the first fixing zone 231 to the bottom of the duct 229 and a fixing surface of the second fixing zone 232 to the sealed membrane.

In accordance with one embodiment, the flexible film forms a fold in which is accommodated a compressible element 99, for example made of wadding, felt, glass wool, rock wool, polymer foam. The compressible element 99 is compressed between the first and second fixing zones 231, 232 and therefore exerts a reaction force that facilitates the fixing by gluing of the first fixing zone 231 and the second fixing zone 232 to the bottom of the duct and to the external face of the sealed membrane, respectively. The obstacle 230 is inserted in the sealed and thermally-insulating tank in the interstice between the bottom of the duct 236 and the sealed membrane.

In accordance with one embodiment, a non-stick film (not represented) that prevents the two parts of the flexible film folded relative to one another sticking together is inserted in the fold of the flexible film in place of or in combination with the compressible element 99.

For the installation of the obstacle 230 in the duct 236 a tool in the form of a blade may be used, where appropriate a curved blade the curvature of which corresponds to the shape of the bottom of the duct, for example the curvature of the stop 62. The non-stick film and the flexible film are successively folded around the edge at the end of the blade in order to push them into the duct 236, for example between the stop 62 and the corner secondary sealed membrane portion 19.

The technique described hereinabove for producing a sealed and thermally-insulating tank may be used in different types of reservoirs, for example in an LNG reservoir in a terrestrial installation or in a floating structure such as a methane tanker or other ship.

In a manner known in itself loading/offloading pipes 73 disposed on the top deck of the ship may be connected by means of appropriate connectors to a maritime or harbour terminal to transfer a cargo of LNG from or to the tank 71.

Figure 15:
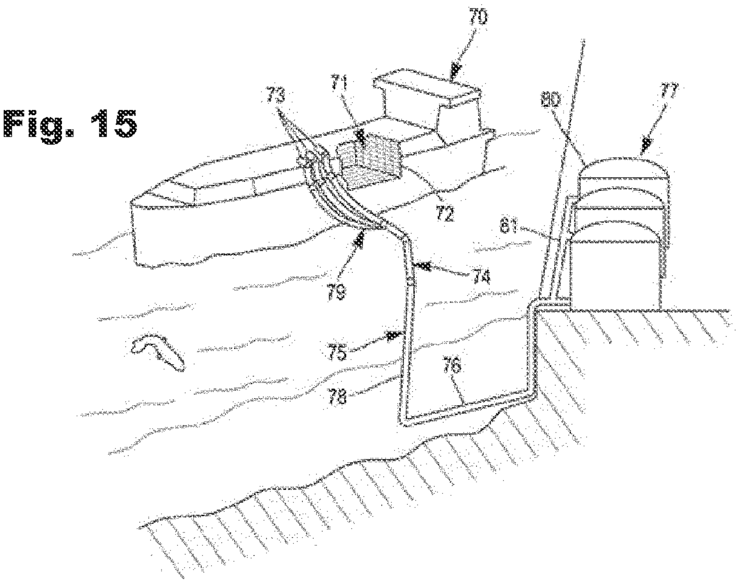
FIG. 15 is a schematic cutaway representation of a methane tanker tank including a sealed and thermally-insulating tank, and of a terminal for loading/offloading that tank.

FIG. 15 shows an example of a maritime terminal including a loading and offloading station 75, an underwater pipe 76 and a terrestrial installation 77. The loading and offloading station 75 is a fixed off-shore installation including a mobile arm 74 and a tower 78 that supports the mobile arm 74. The mobile arm 74 carries a bundle of insulated flexible tubes 79 that can be connected to the loading/offloading pipes 73. The orientable mobile arm 74 adapts to all methane tanker loading gauges. A connecting pipe that is not shown extends inside the tower 78. The loading and offloading station 75 enables loading and offloading of the methane tanker 70 from or to the terrestrial installation 77. The latter includes liquefied gas storage tanks 80 and connecting pipes 81 connected via the underwater pipe 76 to the loading or offloading station 75. The underwater pipe 76 enables transfer of the liquefied gas between the loading or offloading station 75 and the terrestrial installation 77 over a great distance, for example 5 km, which enables the methane tanker ship 70 to remain at a great distance from the coast during loading and offloading operations.

Pumps onboard the ship 70 and/or pumps equipping the terrestrial installation 77 and/or pumps equipping the loading and offloading station 75 are used to generate the pressure necessary to transfer the liquefied gas.

Although the invention has been described in connection with a plurality of particular embodiments, it is obvious that it is in no way limited to them and that it encompasses all technical equivalents and combinations of the means described if the latter fall within the scope of the invention.

Likewise, the embodiment illustrated in the figures represents a pressure-drop obstacle including one or two fixing zones cooperating with the thermally-insulating barrier and a fixing zone cooperating with the secondary sealed membrane, but the number of fixing zones able to cooperate with the sealed membrane and the number of fixing zones able to cooperate with the thermally-insulating barrier may be different. A pressure-drop obstacle can thus include a plurality of fixing zones intended to cooperate with the thermally-insulating barrier alternately with a plurality of fixing zones intended to cooperate with the sealed membrane so that the obstacle portions between a fixing zone on the thermally-insulating barrier and a fixing zone on the sealed membrane extend in a duct to obstruct said duct.

Generally speaking, pressure-drop obstacles of this kind can therefore be installed in any interstice linked to a positioning or production clearance liable to form or to generate in use of a tank a duct favouring convection phenomena.

Although the invention has been described in connection with a plurality of particular embodiments, it is obvious that it is in no way limited to them and that it encompasses all technical equivalents and combinations of the means described if the latter fall within the scope of the invention.

The use of the verb "to have", "to include" or "to comprise" and conjugate forms thereof does not exclude the presence of elements or steps other than those stated in a claim.

In the claims, any reference sign between parentheses should not be interpreted as a limitation of the claim.

The invention claimed is:

1. A sealed and thermally-insulating fluid storage tank wherein a tank wall comprises from the exterior to the interior of the tank a secondary thermally-insulating barrier and a secondary sealed membrane, the secondary sealed membrane being anchored to the secondary thermally-insulating barrier, a primary thermally-insulating barrier resting against the secondary sealed membrane and a primary sealed membrane resting against the primary thermally-insulating barrier and being intended to be in contact with a fluid contained in the tank, wherein said secondary thermally-insulating barrier comprises a first plane portion and a second plane portion oriented at an angle to the first plane portion, a junction between the first secondary thermally-insulating barrier plane portion and the second secondary thermally-insulating barrier plane portion forming an edge, the first plane portion forming a first anchor zone for the secondary sealed membrane, the first anchor zone being at a distance from the edge, the second plane portion forming a second anchor zone for the secondary sealed membrane, the second anchor zone being at a distance from the edge, the secondary thermally-insulating barrier comprising a corner portion between the first anchor zone and the second anchor zone and comprising the edge, the secondary sealed membrane comprising a corner piece, said corner piece being sealed and comprising a first portion anchored to the first anchor zone and a second portion anchored to the second anchor zone, the corner piece further comprising a central portion between the first portion and the second portion, said central portion being free to deform relative to the secondary thermally-insulating barrier in line with the edge, the tank comprising a duct extending in a longitudinal direction parallel to the edge, said duct being delimited by the central portion of the secondary sealed membrane and the corner portion of the secondary thermally-insulating barrier, the corner portion of the secondary thermally-insulating barrier forming a bottom of the duct, the tank further comprising a pressure-drop obstacle arranged in the duct and extending between the bottom of the duct and the central portion of the secondary sealed membrane, in which said pressure-drop obstacle includes an anchor strip and a flexible portion, the anchor strip extending in a direction intersecting the longitudinal direction of the duct, the flexible portion including a plurality of flexible elements projecting from the anchor strip in the direction of the secondary sealed membrane, and a free end of the flexible elements opposite the anchor strip being in contact with the secondary sealed membrane so as to create a pressure drop for a flow circulating in the duct, said flexible elements being able to flex elastically in contact with the secondary sealed membrane.

2. The sealed and thermally-insulating tank as claimed in claim 1 wherein the duct is parallel to the direction of terrestrial gravity or has a component perpendicular to the direction of terrestrial gravity.

3. The sealed and thermally-insulating tank as claimed in claim 1, wherein the anchor strip is fixed to the bottom of the duct.

4. The sealed and thermally-insulating tank as claimed in claim 1, wherein the pressure-drop obstacle comprises a textile layer covering flexible elements of the pressure-drop obstacle.

5. The sealed and thermally-insulating tank as claimed in claim 1, the tank comprising a plurality of pressure-drop obstacles arranged in the duct along the longitudinal direction of the duct.

6. The sealed and thermally-insulating tank as claimed in claim 5, wherein the pressure-drop obstacles of the plurality of pressure-drop obstacles are arranged in the duct at regular intervals along the longitudinal direction of the duct.

7. The sealed and thermally-insulating tank as claimed in claim 5, wherein the pressure-drop obstacles of the plurality of pressure-drop obstacles are arranged in the duct at irregular intervals along the longitudinal direction of the duct.

8. The sealed and thermally-insulating tank as claimed in claim 6, wherein the secondary thermally-insulating barrier forming the bottom of the duct comprises a plurality of spaced insulating panels and a plurality of junction zones situated between the insulating panels and the obstacles are arranged facing the insulating panels in such a manner that the junction zones at each edge of a panel are between the obstacles.

9. A ship for transporting a cold liquid product, the ship comprising a double hull and a tank as claimed in claim 1 disposed in the double hull.

10. A transfer system for a cold liquid product, the system comprising a ship as claimed in claim 9, insulated pipes arranged in such a manner as to connect the tank installed in the hull of the ship to a floating or terrestrial storage installation and a pump for driving a flow of cold liquid product through the insulated pipes from or to the floating or terrestrial storage installation to or from the tanker of the ship.

11. A method loading or offloading a ship as claimed in claim 9, wherein a cold liquid product is routed through insulated pipes from or to a floating or terrestrial storage installation to or from the tank of the ship.

12. A sealed and thermally-insulating fluid storage tank comprising a first tank wall and a second tank wall including from the exterior to the interior of the tank a secondary thermally-insulating barrier and a secondary sealed membrane, the secondary sealed membrane being fixed to the secondary thermally-insulating barrier, a primary thermally-insulating barrier resting against the secondary sealed membrane and a primary sealed membrane resting against the primary thermally-insulating barrier and being intended to be in contact with a fluid contained in the tank, the sealed and thermally-insulating fluid storage tank comprising a corner structure, forming an edge, disposed between the first tank wall and the second tank wall, the secondary thermally-insulating barrier including a first plane portion of the first tank wall and a second plane portion of the second tank wall, the first plane portion forming a first anchor zone for the secondary sealed membrane, the first anchor zone being at a distance from the edge, the second plane portion forming a second anchor zone for the secondary sealed membrane, the second anchor zone being at a distance from the edge, the secondary thermally-insulating barrier including a corner portion between the first anchor zone and the second anchor zone, the secondary sealed membrane of the corner structure including a corner piece, said corner piece being sealed and including a first portion of the secondary sealed membrane being anchored to the first anchor zone and a second portion of the secondary sealed membrane being anchored to the second anchor zone, the corner piece further including a central portion between the first portion and the second portion, the tank including a duct extending in a longitudinal direction parallel to the edge, said duct being delimited by the central portion of the corner piece and the corner portion of the secondary thermally-insulating barrier, the corner portion of the secondary thermally-insulating barrier forming a bottom of the duct, the tank further including a pressure-drop obstacle arranged in the duct, wherein the first portion of the secondary sealed membrane includes a first composite film and the second portion of the secondary sealed membrane includes a second composite film, wherein the central portion includes a composite flexible sealed film, wherein said central portion being free to deform relative to the secondary thermally-insulating barrier in line with the edge by extending between the first and second portions of said corner piece so that said central portion moves away from the edge and enlarges the duct when the tank is cooled, wherein the pressure-drop obstacle extends between the bottom of the duct and the central portion of the corner piece.

* * * * *